US011282547B1

(12) United States Patent
Fortunato et al.

(10) Patent No.: US 11,282,547 B1
(45) Date of Patent: Mar. 22, 2022

(54) INTERFACE FOR FRAMING VIDEOS

(71) Applicant: GoPro, Inc., San Mateo, CA (US)

(72) Inventors: Steven Fortunato, Solana Beach, CA (US); Daryl Stimm, Encinitas, CA (US)

(73) Assignee: GoPro, Inc., San Mateo, CA (US)

( * ) Notice: Subject to any disclaimer, the term of this patent is extended or adjusted under 35 U.S.C. 154(b) by 55 days.

(21) Appl. No.: 17/006,486

(22) Filed: Aug. 28, 2020

Related U.S. Application Data

(60) Provisional application No. 62/894,648, filed on Aug. 30, 2019.

(51) Int. Cl.
| G06F 3/048 | (2013.01) |
| G11B 27/34 | (2006.01) |
| G06F 3/04842 | (2022.01) |
| G06F 3/0482 | (2013.01) |
| G11B 27/10 | (2006.01) |
| G06F 3/04847 | (2022.01) |

(52) U.S. Cl.
CPC .......... *G11B 27/34* (2013.01); *G06F 3/0482* (2013.01); *G06F 3/04842* (2013.01); *G06F 3/04847* (2013.01); *G11B 27/105* (2013.01)

(58) Field of Classification Search
None
See application file for complete search history.

(56) References Cited

U.S. PATENT DOCUMENTS 10,217,488 B1* 2/2019 Huang ................ G06F 3/017
2019/0243530 A1* 8/2019 De Ridder .......... G06F 3/04817

* cited by examiner

*Primary Examiner* — Tuan S Nguyen
(74) *Attorney, Agent, or Firm* — Esplin & Associates, PC

(57) ABSTRACT

A graphical user interface for framing a video may include a framing element. Responsive to user interaction with the framing element, a framing of the video at a moment may be determined. The framing of the video may define viewing direction, viewing size, viewing rotation, and/or viewing projection for a viewing window. The framing of the video at the moment may be determined based on how the video is being presented when the user interacted with the framing element.

16 Claims, 12 Drawing Sheets

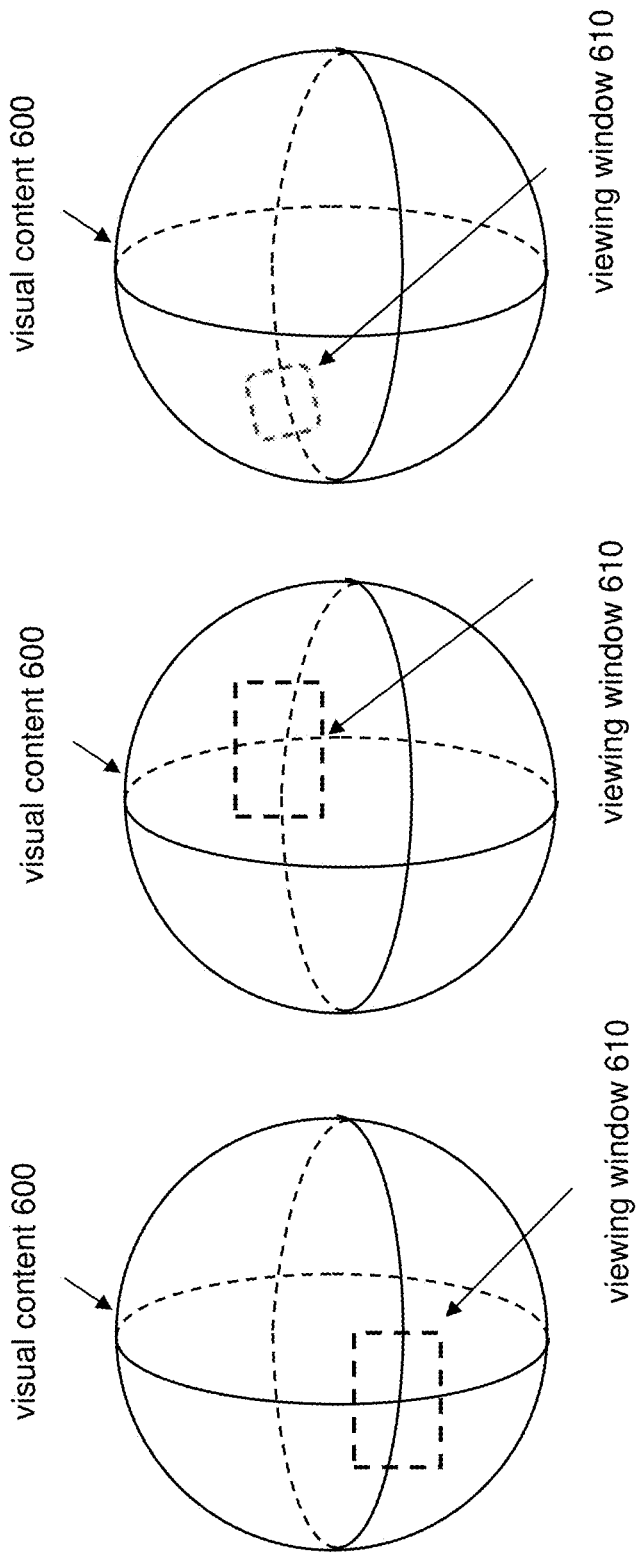

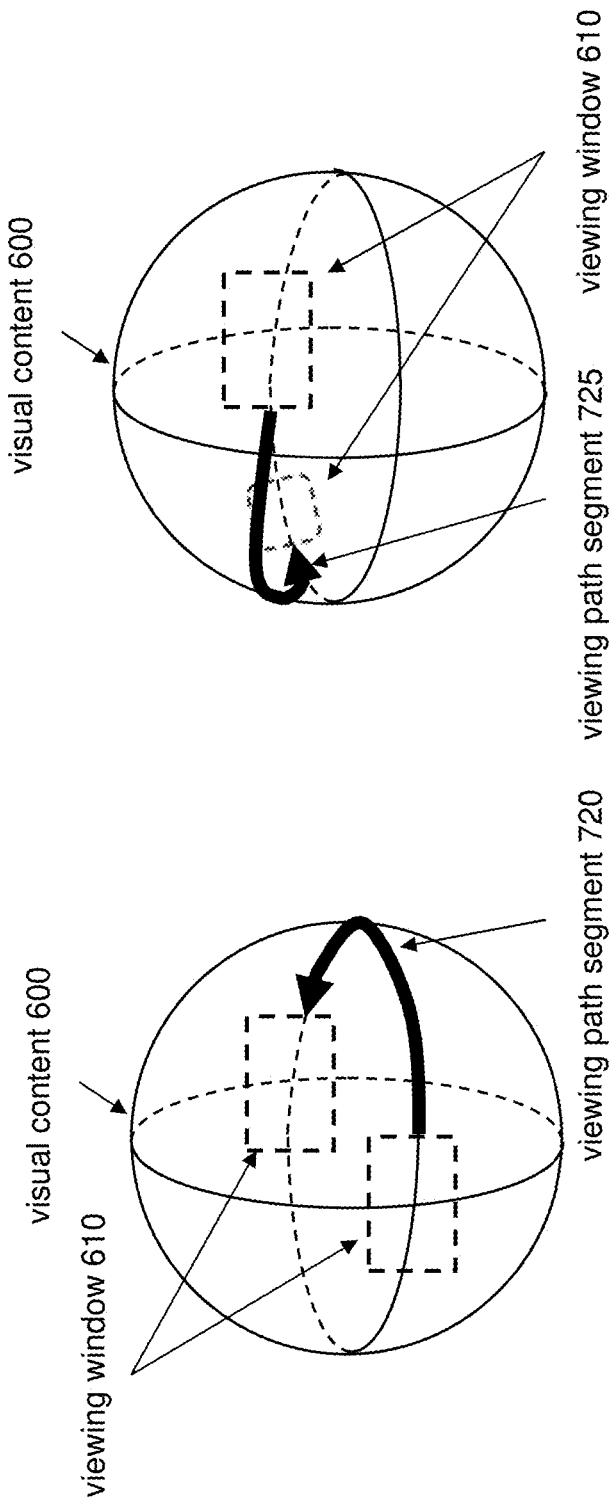

INTERFACE FOR FRAMING VIDEOS

FIELD

This disclosure relates to an interface for framing videos.

BACKGROUND

A wide field of view video (e.g., spherical video, panoramic video) may include more visual content than may be viewed at once. Setting punchout of the video to display different spatial portions of the video during presentation of the video may be difficult and time consuming.

SUMMARY

This disclosure relates to an interface for framing videos. A touchscreen display may be configured to present video content and receive user input during the presentation of the video content. The touchscreen display may be configured to generate output signals indicating location of a user's engagement with the touchscreen display. The video content may have a progress length and may include visual content viewable as a function of progress through the progress length. The visual content may have a field of view. A graphical user interface and the video content may be presented on the touchscreen display. The graphical user interface may include interface elements and may facilitate interaction of the user with one or more of the interface elements via the user input. The interface elements may include a timeline element, a framing element, and/or other interface elements. The timeline element may include a timeline representation of the progress length of the video content. The framing element may enable setting of one or more framings of the visual content. A framing of the visual content may define a positioning of a viewing window within the field of view of the visual content at a corresponding moment within the progress length. The viewing window may define extents of the visual content to be included within a presentation of the video content.

First user interaction with the framing element to set a first framing of the visual content at a first moment within the progress length may be determined. Responsive to the first user interaction with the framing element, a first framing-marker element representing a first framing of the visual content at the first moment within the progress length may be presented on the timeline representation. A location of the first framing-marker element on the timeline representation may correspond to the first moment.

Second user interaction with the framing element to set a second framing of the visual content at a second moment within the progress length may be determined. Responsive to the second user interaction with the framing element, a second framing-marker element representing a second framing of the visual content at the second moment within the progress length may be presented on the timeline representation. A location of the second framing-marker element on the timeline representation may correspond to the second moment. The second framing may be adjacent to the first framing.

For individual pairs of adjacent framings, a framing-change element may be presented between corresponding framing-marker elements. The framing-change element may represent changes in the positioning of the viewing window within the field of view of the visual content between the individual pairs of the adjacent framings. A first framing-change element may be presented between the first framing-marker element and the second framing-marker element. The first framing-change element may represent changes in the positioning of the viewing window within the field of view of the visual content between the first framing and the second framing.

A system that presents an interface for framing videos may include one or more electronic storage, touchscreen display, processor and/or other components. The touchscreen display may be configured to present video content, graphical user interface, and/or other information. The touchscreen display may be configured to receive user input during the presentation of the video content. The touchscreen display may be configured to generate output signals indicating location of a user's engagement with the touchscreen display.

The electronic storage may store information defining video, information relating to video, information relating to video content, information relating to visual content, information relating to graphical user interface, information relating to interface elements of the graphical user interface, information relating to framings of visual content, information relating to viewing window, information relating to positioning of viewing window, information relating to changes in positioning of viewing window, and/or other information.

Content of one or more videos may be referred to as video content. Video content may have a progress length. Video content may include visual content viewable as a function of progress through the progress length of the video content. The visual content may have a field of view.

The processor(s) may be configured by machine-readable instructions. Executing the machine-readable instructions may cause the processor(s) to facilitate presenting an interface for framing videos. The machine-readable instructions may include one or more computer program components. The computer program components may include one or more of a presentation component, a user interaction component, and/or other computer program components.

The presentation component may be configured to present one or more graphical user interfaces, the video content, and/or other information on the touchscreen display. The graphical user interface(s) may include interface elements. The graphical user interface(s) may facilitate interaction of the user with one or more of the interface elements via the user input received through the touchscreen display and/or other user input. The interface elements may include a timeline element, a framing element, and/or other interface elements. The timeline element may include a timeline representation of the progress length of the video content. The framing element may enable setting of a framing of the visual content. The framing of the visual content may define a positioning of a viewing window within the field of view of the visual content at a corresponding moment within the progress length. The viewing window may define extents of the visual content to be included within a presentation of the video content.

In some implementations, the interface elements may further include a positioning-change option element. The positioning-change option element may enable modification of changes in the positioning of the viewing window within the field of view of the visual content.

In some implementations, the interface elements may further include a moment-to-duration element. The moment-to-duration element may enable extension of a moment within the progress length to a duration longer than the moment. The duration may be represented by a moment-to-duration marker element. The moment-to-duration marker element may be presented on and/or adjacent to a portion of the timeline representation corresponding to the duration.

The presentation component may be configured to, responsive to user interaction with the framing element, present on the timeline representation a framing-marker element representing a framing of the visual content at a corresponding moment within the progress length. A location of the framing-marker element on the timeline representation may correspond to the corresponding moment. In some implementations, responsive to user interaction with the moment-to-duration element, visual appearance of the framing-marker elements may be reduced.

In some implementations, the framing of the visual content may define the positioning of the viewing window within the field of view of the visual content based on a viewing direction, a viewing size, a viewing rotation, and/or other information. In some implementations, the framing of the visual content may further define a viewing projection of the visual content within the viewing window.

For example, the presentation component may, responsive to the user interaction with the framing element to set a first framing of the visual content at a first moment within the progress length, present on the timeline representation a first framing-marker element representing the first framing of the visual content at the first moment within the progress length. A location of the first framing-marker element on the timeline representation may correspond to the first moment. The presentation component may, responsive to the user interaction with the framing element to set a second framing of the visual content at a second moment within the progress length, present on the timeline representation a second framing-marker element representing the second framing of the visual content at the second moment within the progress length. A location of the second framing-marker element on the timeline representation may corresponds to the second moment. The second framing may be adjacent to the first framing.

The presentation component may be configured to, for individual pairs of adjacent framings, present a framing-change element between corresponding framing-marker elements. The framing-change element may represent changes in the positioning of the viewing window within the field of view of the visual content between the individual pairs of the adjacent framings. For example, a first framing-change element may be presented between the first framing-marker element and the second framing-marker element. The first framing-change element may represent changes in the positioning of the viewing window within the field of view of the visual content between the first framing and the second framing.

In some implementations, one or more visual characteristics of adjacent framing-change elements may be different such that the first framing-change element and a second framing-change element adjacent to the first framing-change element may be visually different.

In some implementations, the presentation component may be further configured to present one or more visualizations of the changes in the positioning of the viewing window within the field of view of the visual content between the individual pairs of the adjacent framings. In some implementations, the visualization(s) may be manipulatable to modify the changes in the positioning of the viewing window within the field of view of the visual content.

The user interaction component may be configured to determine user interaction with one or more of the interface elements. The user interaction component may be configured to determine user interaction with one or more of timeline element, framing element, framing-marker element, framing-change element, positioning-change option element, moment-to-duration element, moment-to-duration marker element, and/or other interface elements. For example, the user interaction component may determine user interaction with the framing element to set a first framing of the visual content at a first moment within the progress length, user interaction with the framing element to set a second framing of the visual content at a second moment within the progress length, and/or other user interaction with the interface elements.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIGS. 6A, 6B, 6C, and 6D illustrate example framings of visual content.

FIGS. 7A and 7B illustrate examples of viewing path segments.

DETAILED DESCRIPTION

Figure 1:
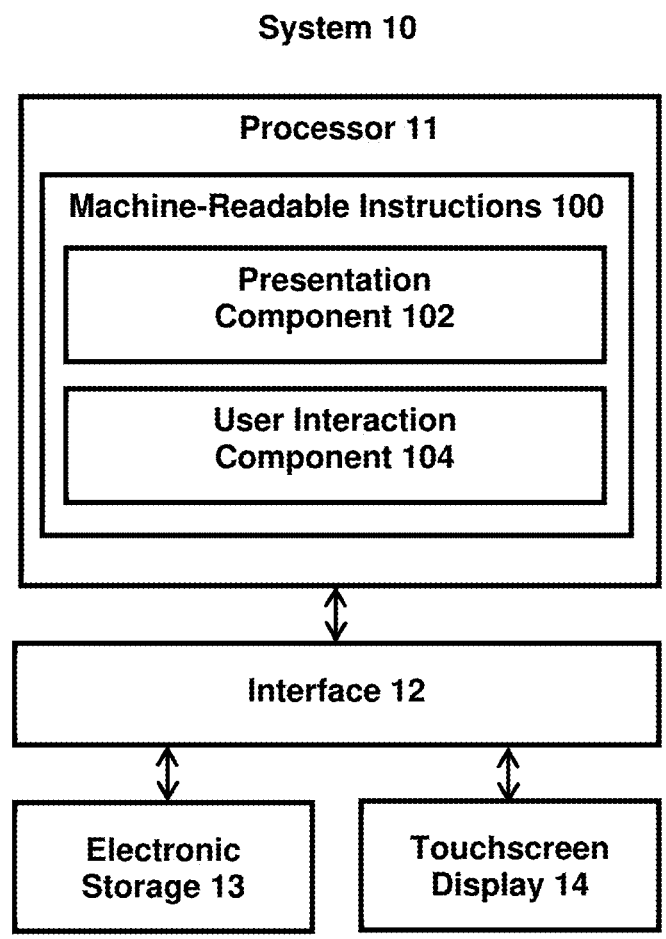
FIG. 1 illustrates a system that presents an interface for framing videos.

FIG. 1 illustrates a system 10 for presenting an interface for framing videos. The system 10 may include one or more of a processor 11, an interface 12 (e.g., bus, wireless interface), an electronic storage 13, a touchscreen display 14, and/or other components. The touchscreen display 14 may be configured to present video content and receive user input during the presentation of the video content. The touchscreen display 14 may be configured to generate output signals indicating location of a user's engagement with the touchscreen display 14. The video content may have a progress length and may include visual content viewable as a function of progress through the progress length. The visual content may have a field of view. A graphical user interface and the video content may be presented on the touchscreen display 14. The graphical user interface may include interface elements and may facilitate interaction of the user with one or more of the interface elements via the user input. The interface elements may include a timeline element, a framing element, and/or other interface elements. The timeline element may include a timeline representation of the progress length of the video content. The framing element may enable setting of one or more framings of the visual content. A framing of the visual content may define a positioning of a viewing window within the field of view of the visual content at a corresponding moment within the progress length. The viewing window may define extents of the visual content to be included within a presentation of the video content.

First user interaction with the framing element to set a first framing of the visual content at a first moment within the progress length may be determined. Responsive to the first user interaction with the framing element, a first framing-marker element representing a first framing of the visual content at the first moment within the progress length may be presented on the timeline representation. A location of the first framing-marker element on the timeline representation may correspond to the first moment.

Second user interaction with the framing element to set a second framing of the visual content at a second moment within the progress length may be determined. Responsive to the second user interaction with the framing element, a second framing-marker element representing a second framing of the visual content at the second moment within the progress length may be presented on the timeline representation. A location of the second framing-marker element on the timeline representation may correspond to the second moment. The second framing may be adjacent to the first framing.

For individual pairs of adjacent framings, a framing-change element may be presented between corresponding framing-marker elements. The framing-change element may represent changes in the positioning of the viewing window within the field of view of the visual content between the individual pairs of the adjacent framings. A first framing-change element may be presented between the first framing-marker element and the second framing-marker element. The first framing-change element may represent changes in the positioning of the viewing window within the field of view of the visual content between the first framing and the second framing.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information defining video, information relating to video, information relating to video content, information relating to visual content, information relating to graphical user interface, information relating to interface elements of the graphical user interface, information relating to framings of visual content, information relating to viewing window, information relating to positioning of viewing window, information relating to changes in positioning of viewing window, and/or other information A video may include content captured by a single image capture device (e.g., image sensor, camera), multiple image capture devices, and/or one or more other capture devices (e.g., sound sensor, microphone). A video including content captured by multiple capture devices may include content captured at the same location(s), content captured at different locations, content captured at the same time(s), and/or content captured at different times. A video may include edited content. For example, a video may include content of one or more other videos that have been edited into a video edit.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of one or more images and/or one or more videos that may be consumed visually. For example, visual content may be included within one or more image and/or one or more video frames of a video. The video frame(s) may define the visual content of the video content. That is, video content may include video frame(s) that define the visual content of the video content. Video frame(s) may define visual content viewable as a function of progress through the progress length of the video content. A video frame may include an image of the video content at a moment within the progress length of the video content. A video frame may include one or more of I-frame, P-frame, B-frame, frame of pixels, and/or other video frames. Visual content may be generated based on light received within a field of view of a single image sensor or within fields of view of multiple image sensors during a capture period.

Visual content may have a field of view. A field of view of visual content may refer to an extent of a scene captured and/or viewable within the visual content. A field of view of visual content may refer to a part of a scene from which light is received for generation of the visual content. For example, the video may include a wide field of view video, such as a spherical video defining visual content viewable from a point of view as a function of progress through the progress length, and the field of view may of the spherical video may include a spherical field of view (360 degrees of capture). Other wide field of view are contemplated. A field of view of visual content may be static (unchanging) or dynamic (changing). For example, a field of view of visual content of video content may change as a function of progress through the progress length of the video content. Other fields of view are contemplated.

Audio content may include audio/sound captured (e.g., by sound sensor(s), microphone(s)) with the capture of the visual content and/or audio/sound provided as an accompaniment for the visual content. Audio content may include one or more of voices, activities, songs, music, and/or other audio/sounds. For example, audio content may include sounds captured by a single sound sensor or an array of sound sensors. The sound sensor(s) may receive and convert sounds into output signals. The output signals may convey sound information and/or other information. The sound information may define audio content in one or more formats, such as WAV, MP3, MP4, RAW. Audio content may include audio/sound generated by one or more computing devices, such as procedural audio. Audio content may be synchronized with the visual content. For example, audio content may include music, song, and/or soundtrack, and the visual content of the video content may be synchronized with music, song, and/or soundtrack.

In some implementations, video content may include one or more of spherical video content, virtual reality content, and/or other video content. Spherical video content and/or virtual reality content may include visual content viewable from one or more points of view as a function of progress through the progress length of the spherical/virtual reality video content.

Spherical video content may refer to video content generated through capture of multiple views from a location. Spherical video content may be captured through the use of one or more image capture devices to capture images/videos from a location. The captured images/videos may be stitched together to form the spherical video content. Spherical video content may include full spherical video content (360 degrees of capture) or partial spherical video content (less than 360 degrees of capture). Partial spherical video content may be referred to as panoramic video content.

Visual content of spherical video content may be included within one or more spherical video frames of the spherical video. The spherical video frame(s) may define the visual content of the video content. That is, spherical video content may include spherical video frame(s) that define the visual content of the spherical video content. Spherical video frame(s) may define visual content viewable from a point of view (e.g., within a sphere, center of a sphere) as a function of progress through the progress length of the spherical video content.

A spherical video frame may include a spherical image of the spherical video content at a moment within the progress length of the spherical video content. Visual content of spherical video content may be generated based on light received within a field of view of a single image sensor or within fields of view of multiple image sensors during a capture period. For example, multiple images/videos captured by multiple cameras/image sensors may be combined/stitched together to form the visual content of the spherical video content. The field of view of camera(s)/image sensor(s) may be moved/rotated (e.g., via movement/rotation of optical element(s), such as lens, of the image sensor(s)) to capture multiple images/videos from a location, which may be combined/stitched together to form the visual content of the spherical video content.

For example, multiple images captured by multiple cameras/images sensors at a moment in time may be combined/stitched together to form a spherical video frame for the moment in time. A spherical video frame may include a full spherical image capture (360-degrees of capture, including opposite poles) or a particular spherical image capture (less than 360-degrees of capture). A spherical image (e.g., spherical video frame) may be comprised of multiple sub-images (sub-frames). Sub-images may be generated by a single image sensor (e.g., at different times as the field of view of the image sensor is rotated) or by multiple image sensors (e.g., individual sub-images for a moment in time captured by individual image sensors and combined/stitched together to form the spherical image).

In some implementations, spherical video content may be stored with at least a 5.2K resolution. Using a 5.2K spherical video content may enable viewing windows (e.g., directed to a portion of a spherical video frame) for the spherical video content with resolution close to 1080p. In some implementations, spherical video content may include 12-bit video frames. Other sizes and qualities of spherical video content (e.g., 5.6K, 8K+) are contemplated. In some implementations, spherical video content may be consumed as virtual reality content.

Virtual reality content may refer to video content that may be consumed via virtual reality experience. Virtual reality content may associate different directions within the virtual reality content with different viewing directions, and a user may view a particular visual portion (e.g., visual content in a particular direction) within the virtual reality content by looking in a particular direction. For example, a user may use a virtual reality headset to change the user's direction of view. The user's direction of view may correspond to a particular direction of view within the virtual reality content. For example, a forward/north looking direction of view for a user may correspond to a forward/north direction of view within the virtual reality content.

Spherical video content and/or virtual reality content may have been captured at one or more locations. For example, spherical video content and/or virtual reality content may have been captured from a stationary position (e.g., a seat in a stadium). Spherical video content and/or virtual reality content may have been captured from a moving position (e.g., a moving bike). Spherical video content and/or virtual reality content may include video content captured from a path taken by the image capture device(s) in the moving position. For example, spherical video content and/or virtual reality content may include video content captured by a spherical camera of a person walking around in a music festival.

Figure 3:
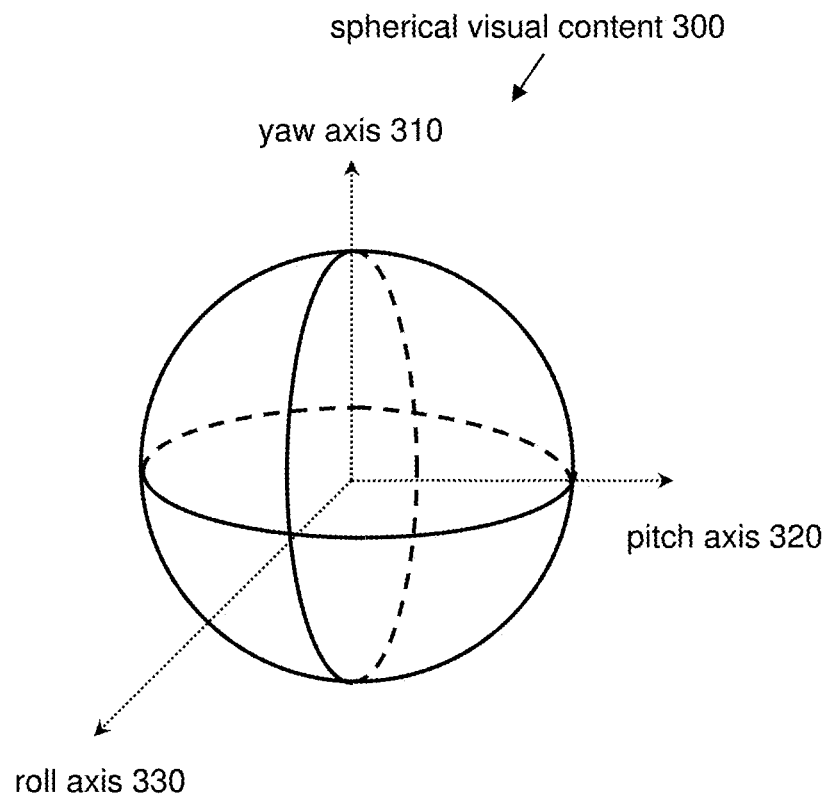
FIG. 3 illustrates an example spherical visual content.

FIG. 3 illustrates an example spherical visual content 300. The spherical visual content 300 may include content of a spherical image or a spherical video. The spherical visual content 300 may include visual content viewable from a point of view (e.g., center of sphere) as a function of progress through the progress length of the spherical visual content 300. FIG. 3 illustrates example rotational axes for the spherical visual content 300. Rotational axes for the spherical visual content 300 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the spherical visual content 300.

For example, a 0-degree rotation of the spherical visual content 300 around the yaw axis 310 may correspond to a front viewing direction. A 90-degree rotation of the spherical visual content 300 around the yaw axis 310 may correspond to a right viewing direction. A 180-degree rotation of the spherical visual content 300 around the yaw axis 310 may correspond to a back-viewing direction. A −90-degree rotation of the spherical visual content 300 around the yaw axis 310 may correspond to a left viewing direction.

A 0-degree rotation of the spherical visual content 300 around the pitch axis 320 may correspond to a viewing direction that may be level with respect to horizon. A 45-degree rotation of the spherical visual content 300 around the pitch axis 320 may correspond to a viewing direction that may be pitched up with respect to horizon by 45-degrees. A 90-degree rotation of the spherical visual content 300 around the pitch axis 320 may correspond to a viewing direction that may be pitched up with respect to horizon by 90-degrees (looking up). A −45-degree rotation of the spherical visual content 300 around the pitch axis 320 may correspond to a viewing direction that may be pitched down with respect to horizon by 45-degrees. A −90-degree rotation of the spherical visual content 300 around the pitch axis 320 may correspond to a viewing direction that may be pitched down with respect to horizon by 90-degrees (looking down).

A 0-degree rotation of the spherical visual content 300 around the roll axis 330 may correspond to a viewing direction that may be upright. A 90-degree rotation of the spherical visual content 300 around the roll axis 330 may correspond to a viewing direction that may be rotated to the right by 90-degrees. A −90-degree rotation of the spherical visual content 300 around the roll axis 330 may correspond to a viewing direction that may be rotated to the left by 90-degrees. Other rotations and viewing directions are contemplated.

A playback of video content (e.g., the spherical video content) may include presentation of one or more portions of visual content on one or more displays based on a viewing window and/or other information. A viewing window may define extents of the visual content viewable on one or more displays as the function of progress through the progress length of the video content. The viewing window may define extents of the visual content presented on the display(s) as the function of progress through the progress length of the video content. For spherical video content, the viewing window may define extents of the visual content viewable from the point of view as the function of progress through the progress length of the spherical video content.

The viewing window may be characterized by viewing directions, viewing sizes (e.g., viewing zoom, viewing magnification), viewing rotations, and/or other information. A viewing direction may define a direction of view for video content. A viewing direction may define the angle/visual portion of the video content at which the viewing window may be directed. A viewing direction may define a direction of view for the video content selected by a user, defined by instructions for viewing the video content, and/or determined based on other information about viewing the video content as a function of progress through the progress length of the video content (e.g., director track specifying viewing direction to be presented during playback as a function of progress through the progress length of the video content). For spherical video content, a viewing direction may define a direction of view from the point of view from which the visual content may be defined. Viewing directions for the video content may be characterized by rotations around the yaw axis 310, the pitch axis 320, the roll axis 330, and/or other axes. For example, a viewing direction of a 0-degree rotation of the video content around a yaw axis (e.g., the yaw axis 310) and a 0-degree rotation of the video content around a pitch axis (e.g., the pitch axis 320) may correspond to a front viewing direction (the viewing window may be directed to a forward portion of the visual content captured within the spherical video content).

Figure 4:
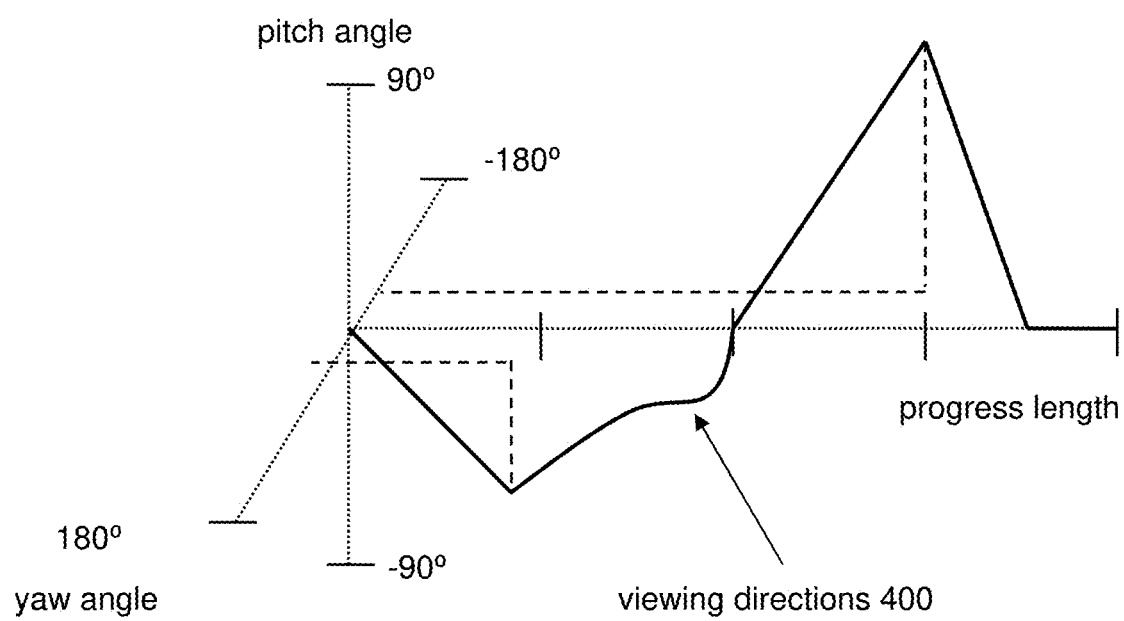
FIG. 4 illustrates example viewing directions for spherical video content.

For example, FIG. 4 illustrates example changes in viewing directions 400 (e.g., selected by a user for video content, specified by a director's track) as a function of progress through the progress length of the video content. The viewing directions 400 may change as a function of progress through the progress length of the video content. For example, at 0% progress mark, the viewing directions 400 may correspond to a zero-degree yaw angle and a zero-degree pitch angle. At 25% progress mark, the viewing directions 400 may correspond to a positive yaw angle and a negative pitch angle. At 50% progress mark, the viewing directions 400 may correspond to a zero-degree yaw angle and a zero-degree pitch angle. At 75% progress mark, the viewing directions 400 may correspond to a negative yaw angle and a positive pitch angle. At 87.5% progress mark, the viewing directions 400 may correspond to a zero-degree yaw angle and a zero-degree pitch angle. The viewing directions 400 may define a path of movement for the viewing window (e.g., a trajectory followed by the viewing window) as a function of progress through the progress length of the video content. Other viewing directions are contemplated.

A viewing size may define a size of the viewing window. A viewing size may define a size (e.g., size, magnification, viewing angle) of viewable extents of visual content within the video content. A viewing size may define the dimensions of the viewing window. A viewing size may define a size of viewable extents of visual content within the video content selected by a user, defined by instructions for viewing the video content, and/or determined based on other information about viewing the video content as a function of progress through the progress length of the video content (e.g., director track specifying viewing size to be presented as a function of progress through the progress length of the video content). In some implementations, a viewing size may define different shapes of viewable extents. For example, a viewing window may be shaped as a rectangle, a triangle, a circle, and/or other shapes.

A viewing rotation may define a rotation of the viewing window. A viewing rotation may define one or more rotations of the viewing window about one or more axis. In some implementations, a viewing rotation may be defined by one or more parameters of a viewing direction. For example, a viewing rotation may be defined based on rotation about an axis (e.g., the roll axis 330) corresponding to a viewing direction. A viewing rotation may define a rotation of the viewing window selected by a user, defined by instructions for viewing the video content, and/or determined based on other information about viewing the video content as a function of progress through the progress length of the video content (e.g., director track specifying viewing rotation to be used as a function of progress through the progress length of the video content). For example, a viewing rotation of a viewing window having a rectangular shape may determine whether the rectangular viewing window is to be positioned in a portrait orientation (e.g., for a portrait view of the video content), in a landscape orientation (e.g., for a landscape view of the video content), and/or other orientation with respect to the visual content of the video content.

Figures 5A, 5B:
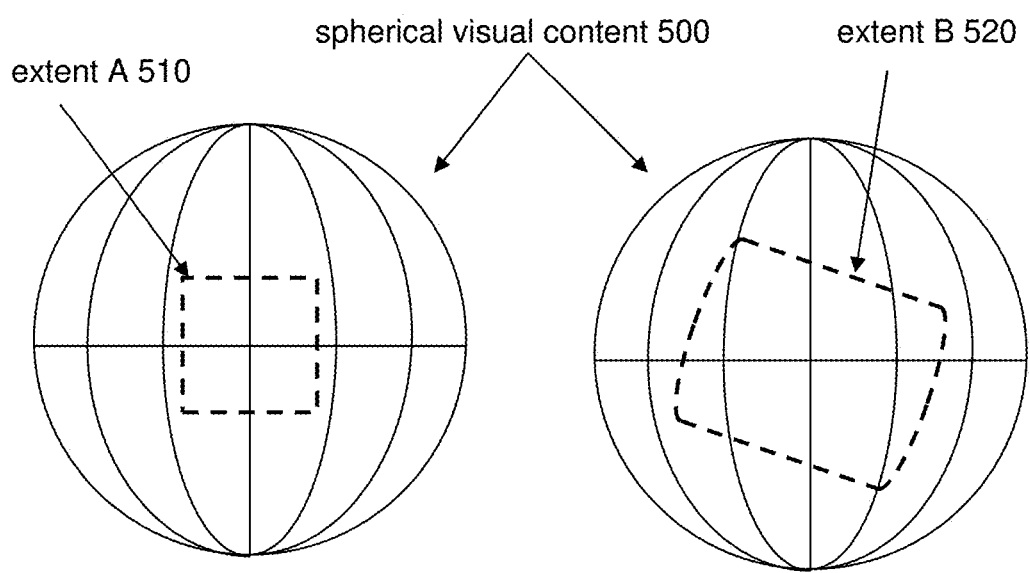
FIGS. 5A-5B illustrate example extents of spherical visual content.

FIGS. 5A-5B illustrate examples of extents for spherical visual content 500. In FIG. 5A, the size of the viewable extent of the spherical visual content 500 may correspond to the size of extent A 510. In FIG. 5B, the size of viewable extent of the spherical visual content 500 may correspond to the size of extent B 520. Viewable extent of the spherical visual content 500 in FIG. 5A may be smaller than viewable extent of the spherical visual content 500 in FIG. 5B. The viewable extent of the spherical visual content 500 in FIG. 5B may be more tilted with respect to the spherical visual content 500 than viewable extent of the spherical visual content 500 in FIG. 5A. Other viewing sizes and viewing rotations are contemplated.

In some implementations, the viewing window may be characterized by a viewing projection. A viewing projection may define how pixels within the viewing window is arranged for presentation on a display. A viewing projection may define how the pixels of an image are arranged to form the visual content. A viewing projection may refer to how portions of the visual content/pixels are mapped onto a two-dimensional plane (e.g., two-dimensional image). For example, a viewing projection may arrange pixels of the image such that one or more visual elements (defined by one or more pixels) of the visual content are stretched (e.g., at the top or bottom of an image arranged using an equirectangular projection) or not stretched (e.g., middle of an image arranged using a rectilinear projection). Example viewing projections may include rectilinear projection, cylindrical projection, Mercator projection, Miller projection, Lambert projection, equirectangular projection, stereographic projection, fisheye projection, equisolid projection, orthographic projection, cubic projection, sinusoidal projection, transverse projection (rotation of a projection by 90 degrees), Panini projection, architectural projection, and/or other viewing projections.

Referring back to FIG. 1, the touchscreen display 14 may be configured to present video content, graphical user interface, and/or other information. The touchscreen display 14 may be configured to receive user input during the presentation of the video content. The touchscreen display 14 may be configured to generate output signals indicating location on the touchscreen display 14 of a user's engagement with the touchscreen display. User input (e.g., for video content, for video application to frame visual content) may be received/determined based on the touchscreen output signals. For example, the touchscreen display 14 may include a touchscreen display of a mobile device (e.g., camera, smartphone, smartwatch, tablet, laptop) or a desktop device (e.g., touch monitor), and user may engage with the touchscreen display 14 to provide user input for video content presented on the touchscreen display 14 and/or video application used to frame the visual content. In some implementations, user input may be provided through user engagement with other user interface devices, such as a keyboard, a mouse, a trackpad, and/or user interface devices. For example, video content and graphical user interface may be presented on a non-touchscreen display, and user interaction with one or more elements of the graphical user interface may be determined and/or facilitated through the user's engagement with a mouse.

The touchscreen display 14 may include one or more touch-sensitive screens and/or other components. A user may engage with the touchscreen display 14 by touching one or more portions of a touch-sensitive screen (e.g., with one or more fingers, stylus). A user may engage with the touchscreen display 14 at a point in time, at multiple points in time, during a period, and/or during multiple periods. A user may tap on or move along the touchscreen display 14 to interact with video content presented the touchscreen display 14 and/or to interact with an application for framing visual content.

For example, with respect to video content, a user may pinch or unpinch (stretch) the touchscreen display 14 to effectuate change in zoom/magnification for presentation of the video content. A user may make a twisting motion (e.g., twisting two figures on the touchscreen display 14, holding one finger in position on the touchscreen display 14 while twisting another figure on the touchscreen display 14) to effectuate visual rotation of the video content (e.g., warping visuals within the video content, changing viewing rotation). A user may make a moving motion (e.g., holding one or more fingers on the touchscreen display 14 and moving the finger(s) in one or more particular directions) to effectuate changes in viewing directions for the video content (e.g., panning which visual portion of the video content is being presented on the touchscreen display 14). As another example, with respect to an application for framing visual content, a user may tap on one or more portions of the touchscreen display 14 corresponding to one or elements of the graphical user interface presented on the touchscreen display 14 to interact (e.g., engage, toggle, manipulate) with the element(s). A user may make a moving motion (e.g., holding one or more fingers on the touchscreen display 14 and moving the finger(s) in one or more particular directions) to effectuate changes to a corresponding one or more elements of the graphical user interface presented on the touchscreen display 14. Other types of engagement with the touchscreen display 14 by users are contemplated.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate presenting an interface for framing videos. The machine-readable instructions 100 may include one or more computer program components. The machine-readable instructions 100 may include one or more of a presentation component 102, a user interaction component 104, and/or other computer program components.

The presentation component 102 may be configured to present one or more graphical user interfaces, the video content, and/or other information on the touchscreen display. A graphical user interface may refer to a user interface that enables a user to interact with the system 10 through one or more interface elements. A graphical user interface may be static or dynamic. A graphical user interface may include a static configuration of interface elements and/or include dynamic configurations of interface elements that changes (e.g., with time, based on user interaction with one or more interface elements). Multiple ones of interface elements may be presented/included within a graphical user interface at the same time, may be presented/included within a graphical user interface at different times, and/or may be presented/included within a graphical user interface responsive to user interaction with one or more other interface elements and/or other information.

An interface element may refer to a graphical element of the user interface, such as windows, icons, buttons, graphics, and/or other visual indicators. An interface element may visually provide information and/or enable a user to provide inputs to the system 10. For example, an interface element may visually provide information determined by the system 10 and/or a user may interact (e.g., engage, toggle, manipulate) with an interface element to provide one or more input to the system 10. A graphical user interface may facilitate interaction of the user with one or more of the interface elements via the user input received through one or more user interface devices (e.g., the touchscreen display 14, a keyboard, a mouse, a trackpad) and/or other user input. For example, a graphical user interface may present/include the interface elements in a particular arrangement and enable the user to interact with individual interface elements by engaging with locations corresponding to the individual interface elements on the touchscreen display 14.

A user may interact with one or more interface elements to determine (e.g., set) framing of visual content. For example, the user may interact with one or more interface elements included within the graphical user interface to select individual moments (point in time, duration of time) within the progress length to specify a framing of the visual content. For a selected moment, the user may interact with one or more interface elements fix one or more of aspects of framing for the visual content (e.g., viewing direction, viewing size, viewing rotation, viewing projection).

The interface elements may include one or more of a timeline element, a framing element, a framing-marker element, a framing-change element, a positioning-change option element, a moment-to-duration element, a moment-to-duration marker element, and/or other interface elements. A timeline element may refer to an interface element that visually represents the progress length (duration) of the video content. The timeline element may include one or more timeline representations of the progress length of the video content. The timeline element may enable a user to provide input to the system 10 based on movement of a timeline representation to select a moment within the progress length. For example, a user may move/drag the timeline representation to change which moment in the progress length is presented on the touchscreen display 14 and/or for which moment in the progress length a framing of the visual content is set.

A framing element may refer to an interface element that enables a user to provide input to the system 10 to set a framing of the visual content. For example, a framing element may be presented/included within the graphical user interface as a button and user interaction (e.g., tapping, clicking on) with the button may provide one or more commands/information to the system 10 to set a framing of the visual content. The framing of the visual content may be set based on how the visual content is being presented (e.g., within the touchscreen display 14, the graphical user interface) when the user interacts with the framing element. A user may set multiple framings of the visual content at different moments within the progress length by interacting with the framing element. A user may set different framings of the visual content by using changing how the visual content is being presented (e.g., changing viewing direction, viewing size, viewing rotation, viewing projection) between usage of the framing element.

A framing of the visual content may define a positioning of a viewing window within the field of view of the visual content at a corresponding moment within the progress length. The corresponding moment may include/be the moment in the progress length that is being presented (e.g., within the touchscreen display 14, the graphical user interface) when the user interacted with the framing element. The viewing window may define extents of the visual content to be included within a presentation of the video content. A positioning of the viewing window within the field of view of the visual content may refer to placement of the viewing window within the field of view of the visual content. A framing of the visual content may define positioning/placement of the viewing window within the field of view of the visual content based on one or more of a viewing direction, a viewing size, a viewing rotation, and/or other information. A framing of the visual content may define arrangement of pixels within the viewing window for presentation. The arrangement of the pixels within the viewing window may be defined by viewing projection and/or other information. The framing of the visual content may further define a viewing projection of the visual content within the viewing window.

The user may interact with the framing element for different moments within the progress length of the video content to set different framings of the visual content at different moments within the progress length. A moment within the progress length may include a point (e.g., point in time, a video frame) or a duration (e.g., a duration of time, a grouping of adjacent video frames) within the progress length.

For example, FIGS. 6A, 6B, and 6C illustrate different framings of visual content 600 set by a user via interaction with the framing element for different moments within the progress length of the visual content 600. For instance, the visual content 600 may include visual content of a video, and FIGS. 6A, 6B, and 6C may illustrate the visual content 600 within different video frames of the video (content of the video frames at different moments within the progress length). For example, as shown in FIG. 6A, the user may have interacted with the framing element to set a framing of the visual content 600 at a first moment within the progress length. The framing may include a viewing window 610 being positioned at the front of the visual content 600 and being leveled within the visual content 600. To set this framing, the user may have interacted with the touchscreen display 14 and/or other user interface devices to point the viewing direction to the front of the sphere, set the zoom to include the size of the viewing window 610 shown in FIG. 6A, and set the rotation of the viewing window to be leveled. The user may have then interacted with the framing element to set the framing shown in FIG. 6A.

As shown in FIG. 6B, the user may have interacted with the framing element to set a framing of the visual content 600 at a second moment (subsequent to the first moment) within the progress length. The framing may include the viewing window 610 being positioned at the back of the visual content 600 and being leveled within the visual content 600. To set this framing, the user may have interacted with the touchscreen display 14 and/or other user interface devices to point the viewing direction to the back of the sphere without changing the zoom and/or the rotation of the viewing window. The user may have then interacted with the framing element to set the framing shown in FIG. 6B.

As shown in FIG. 6C, the user may have interacted with the framing element to set a framing of the visual content 600 at a third moment (subsequent to the second moment) within the progress length. The framing may include the viewing window 610 being positioned at front-upper-right of the visual content 600. The framing of the visual content 600 at the third moment may include the viewing window 610 being tilted and having a different dimension (e.g., different shape, smaller size) than the framing of the visual content at the first moment and the second moment. To set this framing, the user may have interacted with the touchscreen display 14 and/or other user interface devices to point the viewing direction to the front-upper-right of the sphere while changing the zoom (zooming in) and the rotation of the viewing window. The user may have then interacted with the framing element to set the framing shown in FIG. 6C. Other framings of the visual content are contemplated.

A framing-marker element may refer to an interface element that visually represents a framing of the visual content at a corresponding moment within the progress length. A framing-marker element may be presented on and/or adjacent to a portion of the timeline element/timeline representation that represents the corresponding moment. The location of the framing-marker element on the timeline element/timeline representation may correspond to the corresponding moment. For example, one framing-marker element may be presented at a particular location on the timeline element/timeline representation to represent one framing of the visual content at one moment within the progress length, and another framing-marker element may be presented at another location on the timeline element/timeline representation to represent another framing of the visual content at another moment within the progress length A framing-change element may refer to an interface element that visually represents changes in the positioning of the viewing window within the field of view of the visual content between a pair of adjacent framings (framings of the visual content that are next to each other in the progress length). A framing-change element may be presented on and/or adjacent to a portion of the timeline element/timeline representation representing the duration between the adjacent framings. For example, a user may have interacted with the framing element to set framings of the visual content at multiple moments within the progress length. The presentation component 102 may be configured to, for individual pairs of adjacent framings, present a framing-change element between corresponding framing-marker elements. For instance, the user may have interacted with the framing element twice to set framings of the visual content at two moments within the progress length. A framing-change element may be presented between the framing-marker elements representing the two framings. The framing-change element may represent changes in the positioning of the viewing window within the field of view of the visual content between the two framings.

The changes in the positioning of the viewing window within the field of view of the visual content between a pair of adjacent framings may be determined based on the adjacent framings and/or other information. The changes in the positioning of the viewing window over the progress length may be defined by a viewing path. A viewing path may refer to a path or a progression of the positioning of the viewing window within the field of view of the visual content as the function of progress through the progress length. A viewing path may define the positioning of the viewing window within the field of view of the visual content as the function of progress through the progress length. The positioning of the viewing window defined by the viewing path may include the positioning of the viewing window defined by the framings of the visual content set by the user.

Framings of the visual content at different moments within the process length may dictate the positioning of the viewing window defined by the viewing path. Framings of the visual content at different moment within the process length may define fixed positionings of the viewing window within the viewing path.

For example, the framings of the visual content set by the user may include a first framing of the visual content at a first moment within the progress length and a second framing of the visual content at a second moment within the progress length, and the positioning of the viewing window defined by the viewing path may include a first positioning of the viewing window at the first moment based on the first framing of the visual content, a second positioning of the viewing window at the second moment based on the second framing of the visual content, and/or other positioning of the viewing window. Such determination of the viewing path may enable determination of a path through the visual content that takes into account the multiple framings of the visual content. For instance, the multiple framings may reflect a user's intended spatial and temporal positioning of the viewing window for a spherical video and the viewing path may define a path on the sphere that takes into account the user's designations (e.g., markers) that reflect which portions of the spherical video should be presented during playback.

The viewing path may be determined to include changes in the positioning of the viewing window between the fixed positionings of the viewing window within the viewing path. The viewing path may be determined to include change sin the positioning of the viewing window to change the framing of the visual content from one framing to another framing. The viewing path may be determined to include changes between adjacent framings of the visual content (framings of the visual content that are next to each other in the progress length). The viewing path may include viewing path segments for individual pairs of adjacent framings, with individual viewing path segments determined based on the corresponding pairs of adjacent framings.

For example, the viewing path may include a viewing path segment that defines changes in the positioning of the viewing window within the field of view of the visual content from the first positioning at the first moment to the second positioning at the second moment. The changes in the positioning of the viewing window within the field of view of the visual content from the first positioning at the first moment to the second positioning at the second moment may include changes in one or more of a viewing direction, a viewing size, a viewing rotation, and/or a viewing projection for the viewing window.

FIGS. 7A and 7B illustrate examples of viewing path segments 720, 725. The viewing paths 720, 725 may be determined based on the framings of the visual content 600 shown in FIGS. 6A, 6B, and 6C. The framings of the visual content 600 shown in FIGS. 6A, 6B, and 6C may define fixed positionings of the viewing window 610 for the visual content 600 set by a user at different moments within the progress length of the visual content 600. The viewing path for the visual content may be determined to include the viewing path segment 720, 725.

The adjacent framings shown in FIGS. 6A and 6B may be used to determine the viewing path segment 720. Adjacent framings of the visual content may define fixed positionings of the viewing window within the viewing path at their corresponding moments (at the first moment and the second moment). The viewing path segment 720 may be determined based on the adjacent framings to include the fixed positionings of the viewing window within the viewing path so that the viewing path segment 720 starts (at the first moment) with the viewing window 610 positioned at the front of the visual content 600 and being leveled within the visual content 600 and ends (at the second moment) with the viewing window 710 positioned at the back of the visual content 600 and being leveled within the visual content 600.

The viewing path segment 720 may include changes in the positioning of the viewing window between the fixed positionings of the viewing window within the viewing path segment 720 so that one or more of the viewing direction, the viewing size, the viewing rotation, and/or the viewing projection for the viewing window 610 changes from the being positioned at the front of the visual content 600 and being leveled within the visual content 600 to being positioned at the back of the visual content 600 and being leveled within the visual content 600. For instance, in FIG. 7A, the viewing path segment 720 may include changes in the viewing direction of the viewing window 610 from being pointed in the front of the sphere to the back of the sphere. The viewing path segment 720 may include changes in the viewing projection of the viewing window 610 from one type of viewing projection to another type of viewing projection.

The adjacent framings shown in FIGS. 6B and 6C may be used to determine the viewing path segment 725. Adjacent framings of the visual content may define fixed positionings of the viewing window within the viewing path at their corresponding moments (at the second moment and the third moment). The viewing path segment 725 may be determined based on the adjacent framings to include the fixed positionings of the viewing window within the viewing path so that the viewing path segment 725 starts (at the second moment) with the viewing window 610 positioned at the back of the visual content 600 and being leveled within the visual content 600 and ends (at the third moment) with the viewing window 710 positioned at front-upper-right of the visual content 600, being tilted, and having a different dimension (e.g., different shape, smaller size) than the positioning of the visual content at the first moment and the second moment.

The viewing path segment 725 may include changes in the positioning of the viewing window between the fixed positionings of the viewing window within the viewing path segment 725 so that one or more of the viewing direction, the viewing size, the viewing rotation, and/or the viewing projection for the viewing window 610 changes from the being positioned at the back of the visual content 600 and being leveled within the visual content 600 and ends with the viewing window 710 positioned at front-upper-right of the visual content 600, being tilted, and having a different dimension. For instance, in FIG. 7B, the viewing path segment 725 may include changes in the viewing direction of the viewing window 610 from being pointed to the back of the sphere to the front-upper-right of the sphere. The viewing path segment 725 may include changes in the viewing size of the viewing window 610 from being rectangular in shape to be a smaller square in shape. The viewing path segment 725 may include changes in the viewing rotation of the viewing window 610 from being leveled to being tilted. The viewing path segment 725 may include changes in the viewing projection of the viewing window 610 from one type of viewing projection to another type of viewing projection. Other changes in the positioning of the viewing window are contemplated.

One or more presentations of the video content may be generated based on the viewing path and/or other information. A presentation of the video content may include the extents of the visual content within the viewing window. In some implementations, the extents of the visual content within the viewing window may be used to generate a two-dimensional video a spherical video.

Generating a presentation may include displaying the presentation on one or more display. A view of the video may be generated to include the extents of the visual content within the viewing window, with the viewing window changing (e.g., in viewing direction, in viewing size, in viewing rotation, in viewing projection) as a function of progress through the progress length of the visual content based on the viewing path.

Generating a presentation may include generating one or more files used to present the extents of the visual content within the viewing window on one or more display. The file(s) may be used to present the visual content within the viewing window at the time of the generation and/or at a later time. For example, generating a presentation may include generating encoded video content that includes the extents of the visual content within the viewing window and/or instructions for rendering the presentation using the viewing window within the visual content. For example, the presentation may be generated as an encoded version of a video clip, and the video clip may be opened in a video player for presentation. The presentation may be generated as instructions for presenting visual content, such as instructions defining the viewing window as a function of progress through the progress length (e.g., listing the viewing direction, the viewing size, the viewing rotation, and the viewing projection for time stamps within the video). A video player may use the instructions to retrieve the portions of the visual content identified in the instructions for presentation when the video/instructions are opened/to be presented.

In some implementations, one or more visual characteristics of adjacent framing-change elements may be different such that one framing-change element and an adjacent framing-change element may be visually different. For example, two adjacent framing-change element may have different shapes, different colors, different patterns, and/or other different visual characteristics. Usage of different visual characteristics for adjacent framing-change elements may make different viewing path segments more visible within the graphical user interface.

In some implementations, one or more visual characteristics of a framing-change element may be determined based on the type and/or extent of changes in the changes in the positioning of the viewing window within the field of view of the visual content between a pair of adjacent framings. For example, one or more visual characteristics (e.g., shape, color, pattern) of a framing-change element may be determined based on whether and/or to what extent the changes in the positioning of the viewing window include changes in viewing direction, viewing size, viewing rotation, and/or viewing projection. For example, a framing-change element representing a viewing path segment that includes changes in viewing direction may be visually different from a framing-change element representing a viewing path segment that includes changes in viewing projection. A framing-change element representing a viewing path segment that includes changes in viewing direction below a threshold amount may be visually different from a framing-change element representing a viewing path segment that includes changes in viewing direction above a threshold amount. Thus, visual characteristic(s) of the framing-change element may indicate the type and/or extent of changes in the positioning of the viewing window within the field of view of the visual content over the corresponding duration.

A positioning-change option element may refer to an interface element that enables a user to provide input to the system 10 to set/modify how the changes in the positioning of the viewing window between framings are determined. For example, a positioning-change option element may be presented/included within the graphical user interface as a button and user interaction (e.g., tapping, clicking on) with the button may provide one or more commands/information to the system 10 to set/modify how the changes in the positioning of the viewing window between framings are determined (e.g., select interpolation type used to determine the changes in the positioning of the viewing window).

The positioning-change option element may be used to change how the changes in the positioning of the viewing window between all framings are determined. The positioning-change option element may be used to change how the changes in the positioning of the viewing window between a pair framings are determined. For example, the positioning-change option element may enable a user to modify changes in the positioning of the viewing window within the field of view of the visual content by selecting one or more types of interpolation used to determine changes in the positioning of the viewing window between fixed positionings of the viewing window within the viewing path.

For example, the positioning-change option element may present interpolation types that are available for use in determining the viewing path/viewing path segment and enable a user to select the interpolation type(s) to be used for the entire viewing path and/or for one or more viewing path segments. Example interpolation types include one or more of a linear interpolation, a non-linear interpolation, and/or other interpolations. For instance, referring to FIG. 7A, a linear interpolation may determine changes in the positioning of the viewing window along the viewing path segment 720 so that the viewing direction changes linearly (the same amount of change in viewing direction for the same amount of the progress length) from being pointed to the front of the sphere to the back of the sphere. Referring to FIG. 7B, a non-linear interpolation may determine changes in the positioning of the viewing window along the viewing path segment 725 so that the viewing direction changes non-linearly (different amount of change in viewing direction for the same amount of the progress length) from being pointed to the back of the sphere to the front-upper-right of the sphere. For instance, an S-type non-linear curve may be used for non-linear interpolation so there are (1) smaller changes in the viewing direction in the beginning and the end of the viewing path segment 725 and (2) larger changes in the viewing direction in the middle of the viewing path segment 725, or vice versa. Other types of interpolations are contemplated.

A moment-to-duration element may refer to an interface element that enables a user to provide input to the system to extend a moment (e.g., point in time, duration of time) within the progress length to a duration longer than the moment. A user may interact with the moment-to-duration element to increase the progress length. For example, a moment-to-duration element may be presented/included within the graphical user interface as a button and user interaction (e.g., tapping, clicking on) with the button may provide one or more commands/information to the system 10 to extend a moment within the progress length to a duration longer than the moment.

Extending a moment within the progress length to a duration longer than the moment may include duplicating visual content at the moment over the duration. For example, a user may interact with the moment-to-duration element for a point within the progress length. The visual content at the point within the progress length may be duplicated over the duration longer than the point. For instance, a video frame corresponding to the point within the progress length may be duplicated into multiple video frames so that the same content within the video frame is presented during the duration. One or more framings may be set within the duration. The framings within the duration may enable different portions of the visual content corresponding to the duration to be included within a presentation of the visual content. For example, a moment (e.g., point in time, duration of time) within the progress length may be extended to a duration longer than the moment within the progress length/presentation of the video content and multiple framings may be set within the duration to simulate the video being paused for the duration and different portions of the visual content being presented while the video is paused.

Figure 6D:
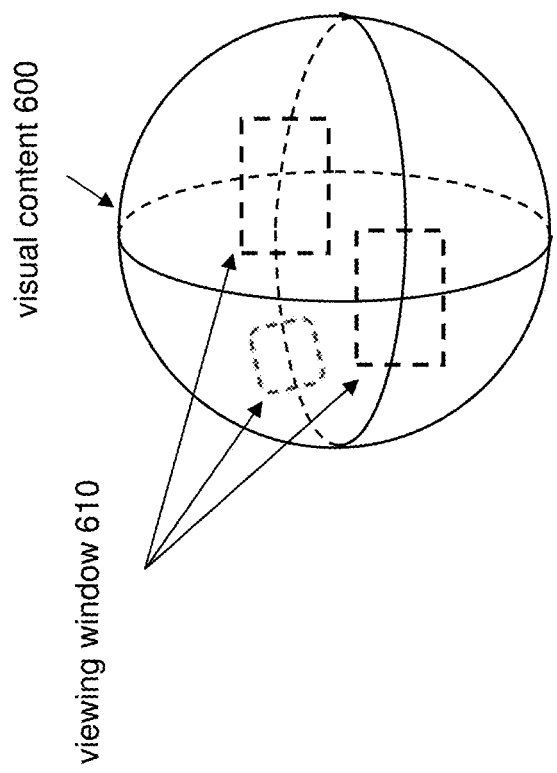

FIG. 6D illustrate an example framings of visual content 600 that has been extended from a moment to a duration longer than the moment. The visual content 600 corresponding to the moment may be duplicated over the duration (the video frame being duplicated to extend the duration) so that the presentation of the video appears to be paused during playback of the duration. Multiple framings of the visual content 600 may be set within the duration. For example, as shown in FIG. 6, three framings may be set via interaction with a framing element within the duration. For instance, the framings of the visual content 600 may include the viewing window 610 being positioned (1) at the front of the visual content 600 and being leveled within the visual content 600 at the beginning of the duration, (2) at the back of the visual content 600 and being leveled within the visual content 600 within the duration (e.g., at the mid-point, at non-midpoint), and (3) at front-upper-right of the visual content 600 and being tiled and having a different dimension at the end of the duration.

A moment-to-duration marker element may refer to an interface element that visually represent the duration that has been extended from a moment within the progress length. A moment-to-duration marker element may be presented on and/or adjacent to a portion of the timeline element/timeline representation that represents the corresponding duration. The location of the moment-to-duration marker element on/adjacent to the timeline element/timeline representation may correspond to the corresponding duration that has been extended from a moment. For example, the location (placement and length) of the moment-to-duration marker element may represent the duration of the progress length that includes duplicated visual content (e.g., duration in which the video appears to be paused during playback).

The presentation component 102 may be configured to present one or more interface elements responsive to user interaction with one or more other interface elements and/or other information. For example, the presentation component 102 may be configured to, responsive to user interaction with the framing element, present on the timeline element/timeline representation a framing-marker element representing a framing of the visual content at a corresponding moment within the progress length. The location of the framing-marker element on the timeline representation may correspond to the corresponding moment.

The presentation component 102 may be configured to, responsive to user interaction with the moment-to-duration element, reduce the visual appearance of the framing-marker elements. For example, size, shape, color, and/or patterns of the framing-marker elements may be reduced to reduce the visual impact of the framing-marker elements within the graphical user interface.

FIGS. 8A, 8B, 8C, 8D, 8E, 9A, and 9B illustrate example graphical user interfaces and interface elements for framing videos. These graphical user interfaces and interface elements are provided merely as examples, and the arrangement and visual aspects of the graphical user interfaces and interface elements may vary depending on the implementation. In some implementations, the graphical user interfaces and/or interface elements may include additional features and/or alternative features.

Figure 8A:
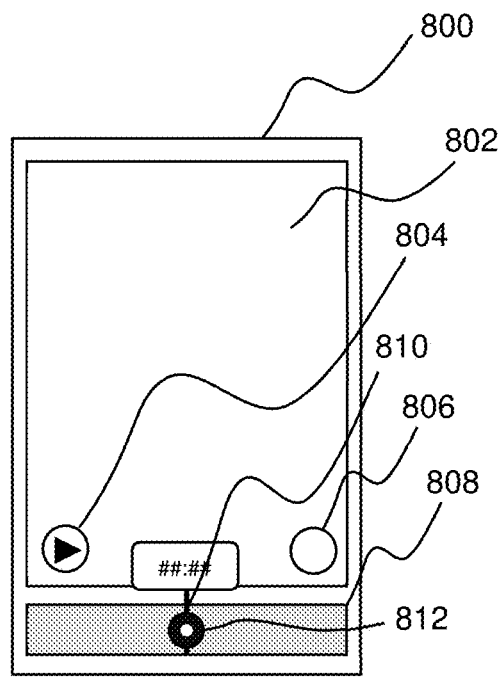
FIGS. 8A, 8B, 8C, 8D, and 8E illustrate example graphical user interface and interface elements for framing videos.

FIGS. 8A, 8B, 8C, 8D, and 8E illustrate a graphical user interface 800. Referring to FIG. 8A, the graphical user interface 800 may include a video content playback portion 802. The video content playback portion 802 may include presentation of video content. The graphical user interface 800 may include a playback element 804. User interaction with the playback element 804 may cause playback of the video content within the video content playback portion 802. The graphical user interface 800 may include a timeline element 808. The timeline element 808 may include or be a timeline representation of the progress length of the video content being presented within the video content playback portion 802. The length of the timeline element 808 may represent the entire progress length of the video content or a portion of the progress length of the video content. The graphical user interface 800 may include a play position element 810. The play position element 810 may visually represent current play position for the video content. The play position element 810 may display time position (e.g., minute:second) of the video content that is being presented within the video content playback portion 802. The play position element 810 may be located at the middle of the timeline element 808/timeline representation.

The graphical user interface 800 may include a framing element 812. The framing element may enable setting of a framing of the visual content. The framing of the visual content may define a positioning of a viewing window within the field of view of the visual content at a corresponding moment within the progress length. The viewing window may define extents of the visual content to be included within a presentation of the video content. The positioning of the viewing window defined by the framing may include the positioning of the viewing window used to present the video content within the video content playback portion 802. That is, the user may position the viewing window to see, at a moment within the progress length of the video content, a particular spatial portion of the visual content by selecting one or more of viewing direction, viewing size, viewing rotation, and/or viewing projection. The spatial portion of the visual content displayed within the video content playback portion 802 may be set as a framing for the visual content at the moment based on user interaction with the framing element 812.

Figure 8B:
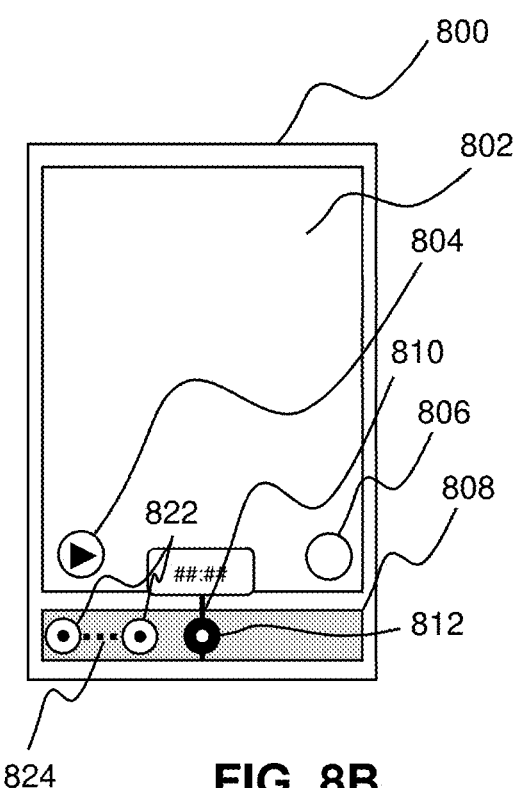
Figure 8C:
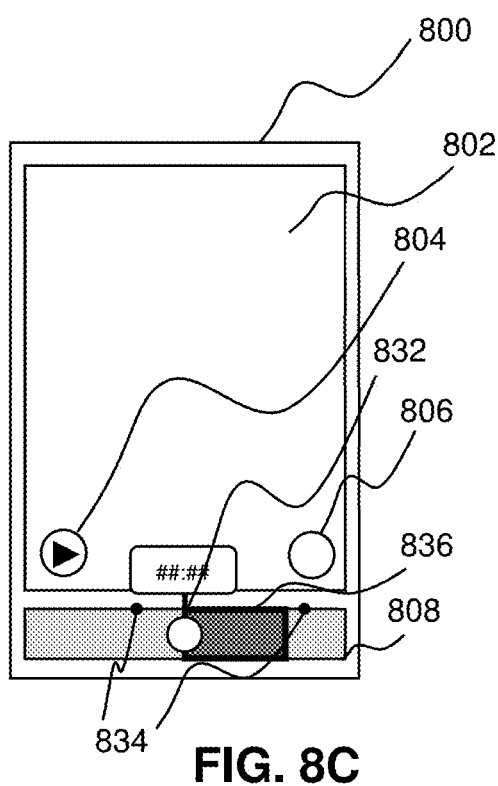

Responsive to user interaction with the framing element 812, a framing-marker element representing a framing of the visual content at a corresponding moment within the progress length may be presented/included within the timeline element 808. For example, as shown in FIG. 8B, a user may have interacted with the framing element 812 twice, and framing-marker elements 822 may be presented/included within the timeline element 808. The locations of the framing-marker elements 822 on the timeline element 808 may correspond to the moments corresponding to the framings.

For individual pairs of adjacent framings, a framing-change element may be presented/included between corresponding framing-marker elements. The framing-change element may represent changes in the positioning of the viewing window within the field of view of the visual content between the individual pairs of the adjacent framings. For example, referring to FIG. 8B, a framing-change element 824 may be presented/included between the framing-marker elements 822. The framing-change element 824 may represent changes in the positioning of the viewing window within the field of view of the visual content between the pair of adjacent framings represented by the framing-marker elements 822. The framing-change element 824 may represent changes in the positioning of the viewing window within the field of view of the visual content automatically determined based on the pair of adjacent framings represented by the framing-marker elements 822.

The graphical user interface 800 may include a moment-to-duration element 806. The moment-to-duration element 806 may enable extension of a moment within the progress length to a duration longer than the moment. For example, referring to FIG. 8C, responsive to user interaction with the moment-to-duration element 6, an extension position element 832 may be presented/included within the top of the timeline element 808/timeline representation. The moment corresponding to the extension position element 832 may be extended to a duration longer than the moment by moving (e.g., dragging) the extension position element 832 and/or the timeline element 808/timeline representation across the extension position element 832. For instance, in FIG. 8C, an extended duration box 836 may be presented based on movement of the timeline element 808. The length of the duration box 836 may represent the length of the duration. The visual content at the moment may be duplicated over the portion of the progress length represented by the extended duration box 836.

In some implementations, responsive to user interaction with the moment-to-duration element 805, visual appearance of the framing-marker element(s) may be reduced. For example, referring to FIG. 8C, responsive to user interaction with the moment-to-duration element 805, visual appearance of the framing-marker element 834 may be changed (e.g., reduced in size) to reduce the amount of space taken by the framing-marker element 834 within the graphical user interface. Reducing the visual appearance of the framing-marker element(s) may make it easier for the user to interact with the extension position element 832 and/or the timeline element 808/timeline representation to set the duration to which the moment is extended.

Figure 8D:
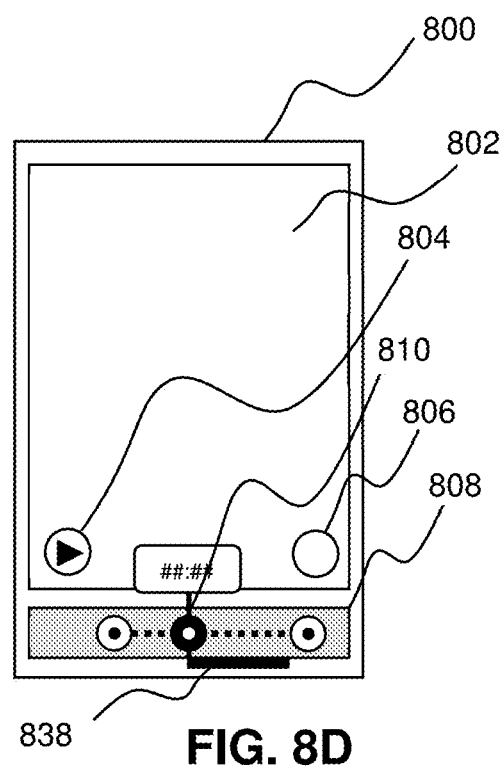

Referring to FIG. 8D, a duration extended from a moment via user interaction with the moment-to-duration element 806 may be represented by a moment-to-duration marker element 838. For example, after the extended duration has been set, the extended duration box 836 may disappear and the moment-to-duration marker element 838 may be presented on and/or adjacent to the portion of the timeline element 808/timeline representation corresponding to the duration extended from the moment. The moment-to-duration marker element 838 may make it easier for the user to see and/or find the portion of the progress length that has been extended (includes duplicate visual content).

Figure 8E:
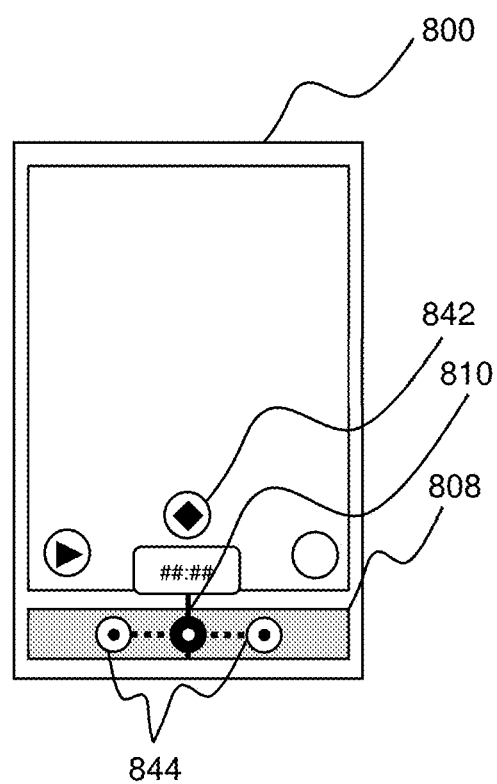

Referring to FIG. 8E, the graphical user interface 800 may include a positioning-change option element 842. The positioning-change option element 842 may enable modification of changes in the positioning of the viewing window within the field of view of the visual content. The positioning-change option element 842 may enable selection of interpolation used to determine changes in the positioning of the viewing window within the field of view of the visual content. For example, the positioning-change option element 842 may be presented based on the play position element 810 being located between framing-marker elements 844. User interaction with the positioning-change option element 842 may cause presentation of interpolation options. The interpolation selected by the user may be used to determine changes in the positioning of the viewing window between the framings represented by the framing-marker elements 844.

Figure 9A:
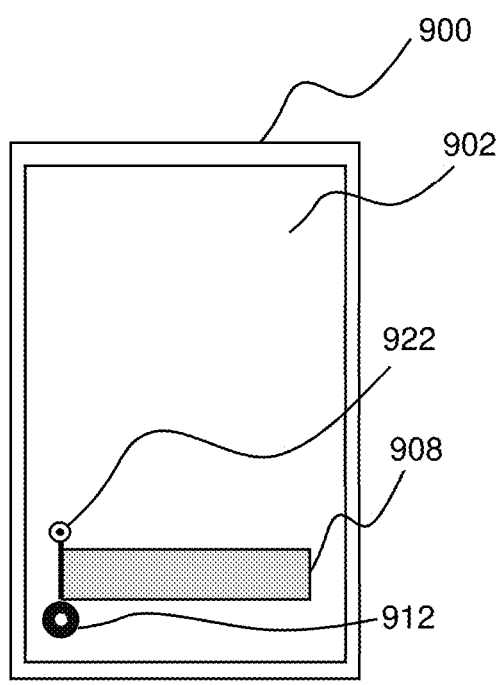
FIGS. 9A and 9B illustrate example graphical user interface and interface elements for framing videos.

Referring to FIG. 9A, the graphical user interface 900 may include a video content playback portion 902, a timeline element 908, and a framing element 912. The location of the framing element 912 along the timeline element 908 may correspond to the moment at which framing of the visual content is set (based on user interaction with the framing element 912). The user may have interacted with the framing element 912 to set a framing at the beginning of the progress length of the video content. The framing at the beginning of the progress length may be represented by a framing-marker element 922.

Figure 9B:
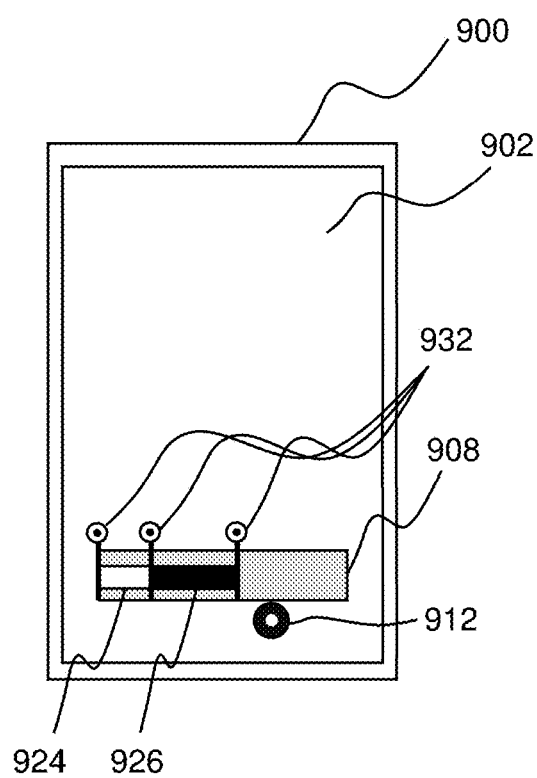

Referring to FIG. 9B, the graphical user interface 900 may include multiple framing-marker elements 932 based on multiple user interaction with the framing element 912 to set multiple framings at different moments. The locations of the framing-marker elements 932 may correspond to the moments corresponding to multiple framings. For individual pairs of adjacent framings, a framing-change element may be presented/included between corresponding framing-marker elements. For instance, in FIG. 9B, a framing-change element 924 may be presented/included between first two framing-marker elements and a framing-change element 926 may be presented/included between last two framing-marker elements. One or more visual characteristics of adjacent framing-change elements may be different such that the framing-change element 924 and the framing-change element 926 adjacent to the framing-change element 924 may be visually different. For example, the framing-change elements 924, 926 may have different colors and/or patterns.

In some implementations, one or more of the interface elements may have multiple functions. For example, referring to FIG. 9A, clicking/tapping on the framing element 912 may cause a framing of the visual content to be set. Holding down on the framing element 912 may enable extension of a moment within the progress length to a duration longer than the moment. That is, holding down on the framing element 912 may cause the framing element 912 to operate as a moment-to-duration element. Other functions/function-combinations of interface elements are contemplated.

Referring back to FIG. 1, in some implementations, the presentation component 102 may be further configured to present one or more visualizations of the positioning of the viewing window within the field of view of the visual content between the individual pairs of the adjacent framings and/or the changes in the positioning of the viewing window within the field of view of the visual content between the individual pairs of the adjacent framings. For example, referring to FIGS. 7A and 7B, the presentation component 102 may be configured to present one or more visualization of the positioning of the viewing window 610 within the field of view of the visual content 600. The presentation component 102 may be configured to present one or more visualization of the changes in the positioning of the viewing window 610 defined by the viewing path segment 720 and/or the viewing path segment 725.

Figure 10:
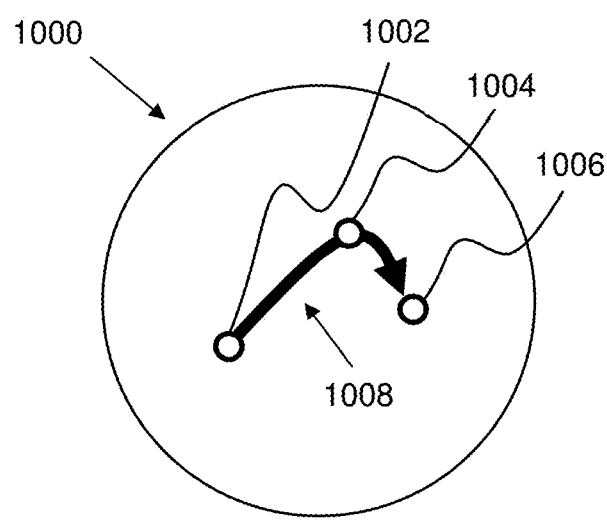
FIG. 10 illustrates an example visualization of changes in positioning of the viewing window between individual pairs of adjacent framings.

FIG. 10 illustrates an example visualization 1000 of changes in positioning of the viewing window within the field of view of the visual content between individual pairs of adjacent framings. The visualization 1000 may be include a circle or a sphere representing spherical visual content. The visualization 1000 may include makers 1002, 1004, 1006 representing framings of the visual content. The framing represented by the marker 1002 may be adjacent to the framing represented by the marker 1004. The framing represented by the marker 1006 may be adjacent to the framing represented by the marker 1004. The visualization 1000 may include a viewing path line 1008 representing the changes in positioning of the viewing window within the field of view of the visual content between individual pairs of adjacent framings. For instance, the markers 1002, 1004, 1006 may be positioned on the circle/sphere to represent viewing directions corresponding to the framings, and the viewing path line 1008 may represent changes in the viewing direction of the viewing widow between different framings.

In some implementations, the visualization(s) may be manipulatable to modify the positioning of the viewing within the field of view of the visual content and/or the changes in the positioning of the viewing window within the field of view of the visual content. For example, a user may interact with the markers 1002, 1004, 1006 to modify the framings of the visual content. For instance, the user may change the locations of the markers 1002, 1004, 1006 on the circle/sphere to change the viewing directions for the framings. A user may interact with the viewing path line 1008 to modify the changes in the positioning of the viewing window within the field of view of the visual content. For example, a user may interact with the viewing path line 1008 to change how the viewing direction changes between different positionings fixed by the framings. For instance, the user may change the curvature and/or the length of the viewing path line 1008 to modify the changes in the viewing directions of the viewing window between different framings.

As another example, user interaction with the markers 1002, 1004, 1006 may cause presentation of information relating to the corresponding framings. For example, responsive to user interaction with the marker 1002, information on the corresponding framing (e.g., viewing direction, viewing size, viewing rotation, and/or viewing projection) may be presented. The graphical user interface may present one or more options to change one or more aspects of the framing. Other visualizations and manipulations of visualizations are contemplated.

The user interaction component 104 may be configured to determine user interaction with one or more of the interface elements. User interaction with interface element(s) may be determined based on user engagement with one or more user interface devices, such as the touchscreen display 14, a keyboard, a mouse, a trackpad, and/or other user interface devices. For example, based on output signals generated by the touchscreen display 14, the location of user engagement with the touchscreen display 14 may be determined, and the location of the touchscreen display 14 may correspond to one or more user interacted interface elements.

The user interaction component 104 may be configured to determine user interaction with one or more of timeline element, framing element, framing-marker element, framing-change element, positioning-change option element, moment-to-duration element, moment-to-duration marker element, and/or other interface elements. For example, the user interaction component 104 may be configured to determine user interaction with the framing element to set a first framing of the visual content at a first moment within the progress length, user interaction with the framing element to set a second framing of the visual content at a second moment within the progress length, and/or other user interaction with the interface elements. The user interaction component 104 may be configured to determine user interaction with the positioning-change option element to modify the changes in the positioning of the viewing window within the field of view of the visual content. The user interaction component 104 may be configured to determine user interaction with the moment-to-duration element to extend a moment within the progress length to a duration longer than the moment. Other determinations of user interaction with interface elements are contemplated.

The user interaction component 104 may be configured to determine user interaction with other presented information (e.g., information presented on the touchscreen display 14/graphical user interface). For example, the user interaction component 104 may be configured to determine user interaction with visualization of the positioning of the viewing window within the field of view of the visual content to modify the positioning of the viewing window. The user interaction component 104 may be configured to determine user interaction with visualization of the changes in the positioning of the viewing window to modify the changes in the positioning of the viewing window. Other determinations of user interaction with graphical user interface are contemplated.

While the present disclosure may be directed to video content, one or more other implementations of the system may be configured for other types media content. Other types of media content may include one or more of audio content (e.g., music, podcasts, audio books, and/or other audio content), multimedia presentations, images, slideshows, visual content (one or more images and/or videos), and/or other media content.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
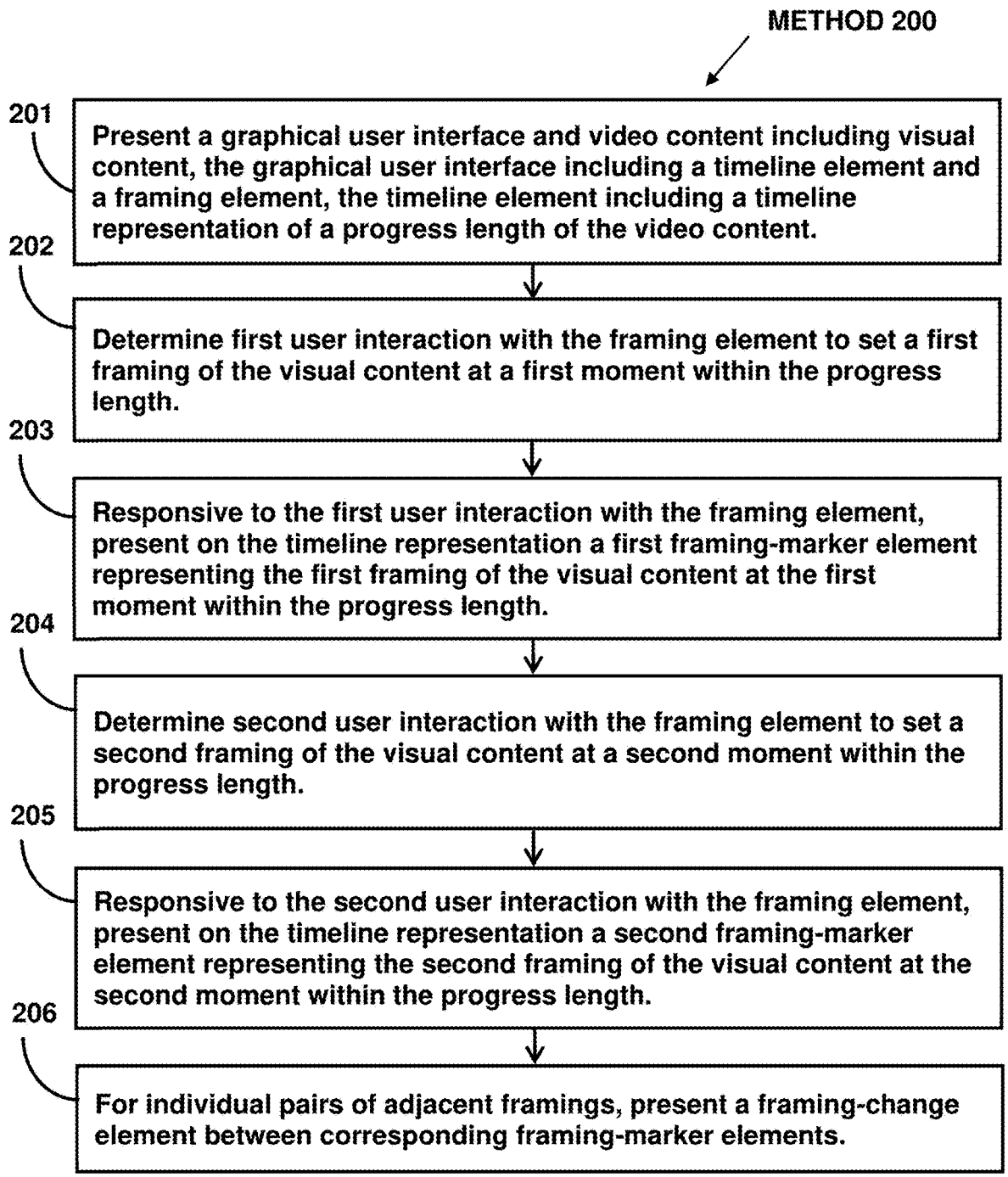
FIG. 2 illustrates a method for presenting an interface for framing videos.

FIG. 2 illustrates method 200 for presenting an interface for framing videos. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, a graphical user interface and video content may be presented on a touchscreen display. The touchscreen display may be configured to present the video content and receive user input during the presentation of the video content. The touchscreen display may be configured to generate output signals indicating location of a user's engagement with the touchscreen display. The video content may have a progress length and may include visual content viewable as a function of progress through the progress length. The visual content may have a field of view. The graphical user interface may include interface elements and may facilitate interaction of the user with one or more of the interface elements via the user input. The interface elements may include a timeline element, a framing element, and/or other interface elements. The timeline element may include a timeline representation of the progress length of the video content. The framing element may enable setting of one or more framings of the visual content. A framing of the visual content may define a positioning of a viewing window within the field of view of the visual content at a corresponding moment within the progress length. The viewing window may define extents of the visual content to be included within a presentation of the video content. In some implementation, operation 201 may be performed by a processor component the same as or similar to the presentation component 102 (Shown in FIG. 1 and described herein).

At operation 202, first user interaction with the framing element to set a first framing of the visual content at a first moment within the progress length may be determined. In some implementations, operation 202 may be performed by a processor component the same as or similar to the user interaction component 104 (Shown in FIG. 1 and described herein).

At operation 203, responsive to the first user interaction with the framing element, a first framing-marker element representing a first framing of the visual content at the first moment within the progress length may be presented on the timeline representation. A location of the first framing-marker element on the timeline representation may correspond to the first moment. In some implementations, operation 203 may be performed by a processor component the same as or similar to the presentation component 102 (Shown in FIG. 1 and described herein).

At operation 204, second user interaction with the framing element to set a second framing of the visual content at a second moment within the progress length may be determined. In some implementations, operation 204 may be performed by a processor component the same as or similar to the user interaction component 104 (Shown in FIG. 1 and described herein).

At operation 205, responsive to the second user interaction with the framing element, a second framing-marker element representing a second framing of the visual content at the second moment within the progress length may be presented on the timeline representation. A location of the second framing-marker element on the timeline representation may correspond to the second moment. The second framing may be adjacent to the first framing. In some implementations, operation 205 may be performed by a processor component the same as or similar to the presentation component 102 (Shown in FIG. 1 and described herein).

At operation 206, for individual pairs of adjacent framings, a framing-change element may be presented between corresponding framing-marker elements. The framing-change element may represent changes in the positioning of the viewing window within the field of view of the visual content between the individual pairs of the adjacent framings. A first framing-change element may be presented between the first framing-marker element and the second framing-marker element. The first framing-change element may represent changes in the positioning of the viewing window within the field of view of the visual content between the first framing and the second framing. In some implementations, operation 206 may be performed by a processor component the same as or similar to the presentation component 102 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for presenting an interface for framing videos, the system comprising:
  a touchscreen display configured to present video content and receive user input during the presentation of the video content, the video content having a progress length and including visual content viewable as a function of progress through the progress length, the visual content having a field of view, wherein the touchscreen display is configured to generate output signals indicating location of a user's engagement with the touchscreen display; and
  one or more physical processors configured by machine-readable instructions to:
    present a graphical user interface and the video content on the touchscreen display, the graphical user interface including interface elements and facilitating interaction of the user with one or more of the interface elements via the user input, wherein the interface elements include a timeline element and a framing element, the timeline element including a timeline representation of the progress length of the video content, the framing element enabling setting of a framing of the visual content, the framing of the visual content defining a positioning of a viewing window within the field of view of the visual content at a corresponding moment within the progress length based on a viewing direction, a viewing size, and a viewing rotation, the viewing window defining extents of the visual content to be included within a presentation of the video content;
    determine first user interaction with the framing element to set a first framing of the visual content at a first moment within the progress length;
    responsive to the first user interaction with the framing element, present on the timeline representation a first framing-marker element representing the first framing of the visual content at the first moment within the progress length, wherein a location of the first framing-marker element on the timeline representation corresponds to the first moment;

determine second user interaction with the framing element to set a second framing of the visual content at a second moment within the progress length;

responsive to the second user interaction with the framing element, present on the timeline representation a second framing-marker element representing the second framing of the visual content at the second moment within the progress length, wherein a location of the second framing-marker element on the timeline representation corresponds to the second moment and the second framing is adjacent to the first framing; and for individual pairs of adjacent framings, present a framing-change element between corresponding framing-marker elements, the framing-change element representing changes in the positioning of the viewing window within the field of view of the visual content between the individual pairs of the adjacent framings, wherein a first framing-change element is presented between the first framing-marker element and the second framing-marker element, the first framing-change element representing changes in the positioning of the viewing window within the field of view of the visual content between the first framing and the second framing;

wherein the interface elements further include a first positioning-change option element, the first positioning-change option element enabling modification of the changes in the positioning of the viewing window within the field of view of the visual content between the first framing and the second framing, wherein user interaction with the first positioning-change option element results in presentation of interpolation options, the interpolation options corresponding to different types of interpolation that determine different changes in the positioning of the viewing window within the field of view of the visual content between the first framing and the second framing.

2. The system of claim 1 wherein the framing of the visual content further defines a viewing projection of the visual content within the viewing window.

3. The system of claim 1, wherein one or more visual characteristics of adjacent framing-change elements are different such that the first framing-change element and a second framing-change element adjacent to the first framing-change element are visually different.

4. The system of claim 1, wherein the one or more physical processors are further configured by the machine-readable instructions to present a visualization of the changes in the positioning of the viewing window within the field of view of the visual content between the individual pairs of the adjacent framings.

5. The system of claim 4, wherein the visualization is manipulatable to modify the changes in the positioning of the viewing window within the field of view of the visual content.

6. The system of claim 1, wherein the interface elements further include a moment-to-duration element, the moment-to-duration element enabling extension of a moment within the progress length to a duration longer than the moment, wherein the duration is represented by a moment-to-duration marker element.

7. The system of claim 6, wherein the moment-to-duration marker element is presented on or adjacent to a portion of the timeline representation corresponding to the duration.

8. The system of claim 6, wherein responsive to user interaction with the moment-to-duration element, visual appearance of the framing-marker elements is reduced.

9. A method for presenting an interface for framing videos, the method performed by a computing system including one or more processors, the method comprising:

presenting, by the computing system, a graphical user interface and video content on a touchscreen display, the touchscreen display configured to present the video content and receive user input during the presentation of the video content, wherein the touchscreen display is configured to generate output signals indicating location of a user's engagement with the touchscreen display, the video content having a progress length and including visual content viewable as a function of progress through the progress length, the visual content having a field of view, the graphical user interface including interface elements and facilitating interaction of the user with one or more of the interface elements via the user input, wherein the interface elements include a timeline element and a framing element, the timeline element including a timeline representation of the progress length of the video content, the framing element enabling setting of a framing of the visual content, the framing of the visual content defining a positioning of a viewing window within the field of view of the visual content at a corresponding moment within the progress length based on a viewing direction, a viewing size, and a viewing rotation, the viewing window defining extents of the visual content to be included within a presentation of the video content;

determining, by the computing system, first user interaction with the framing element to set a first framing of the visual content at a first moment within the progress length;

responsive to the first user interaction with the framing element, presenting, by the computing system, on the timeline representation a first framing-marker element representing the first framing of the visual content at the first moment within the progress length, wherein a location of the first framing-marker element on the timeline representation corresponds to the first moment;

determining, by the computing system, second user interaction with the framing element to set a second framing of the visual content at a second moment within the progress length;

responsive to the second user interaction with the framing element, presenting, by the computing system, on the timeline representation a second framing-marker element representing the second framing of the visual content at the second moment within the progress length, wherein a location of the second framing-marker element on the timeline representation corresponds to the second moment and the second framing is adjacent to the first framing; and for individual pairs of adjacent framings, presenting, by the computing system, a framing-change element between corresponding framing-marker elements, the framing-change element representing changes in the positioning of the viewing window within the field of view of the visual content between the individual pairs of the adjacent framings, wherein a first framing-change element is presented between the first framing-marker element and the second framing-marker element, the first framing-change element representing changes in the positioning of the viewing window within the field of view of the visual content between the first framing and the second framing;
- wherein the interface elements further include a first positioning-change option element, the first positioning-change option element enabling modification of the changes in the positioning of the viewing window within the field of view of the visual content between the first framing and the second framing, wherein user interaction with the first positioning-change option element results in presentation of interpolation options, the interpolation options corresponding to different types of interpolation that determine different changes in the positioning of the viewing window within the field of view of the visual content between the first framing and the second framing.

10. The method of claim 9, wherein the framing of the visual content further defines a viewing projection of the visual content within the viewing window.

11. The method of claim 9, wherein one or more visual characteristics of adjacent framing-change elements are different such that the first framing-change element and a second framing-change element adjacent to the first framing-change element are visually different.

12. The method of claim 9, further comprising presenting, by the computing system, a visualization of the changes in the positioning of the viewing window within the field of view of the visual content between the individual pairs of the adjacent framings.

13. The method of claim 12, wherein the visualization is manipulatable to modify the changes in the positioning of the viewing window within the field of view of the visual content.

14. The method of claim 9, wherein the interface elements further include a moment-to-duration element, the moment-to-duration element enabling extension of a moment within the progress length to a duration longer than the moment, wherein the duration is represented by a moment-to-duration marker element.

15. The method of claim 14, wherein the moment-to-duration marker element is presented on or adjacent to a portion of the timeline representation corresponding to the duration.

16. The method of claim 14, wherein responsive to user interaction with the moment-to-duration element, visual appearance of the framing-marker elements is reduced.

* * * * *